(No Model.)

F. P. MURPHEY.

CORN PLANTER.

No. 398,789.

5 Sheets—Sheet 1

Patented Feb. 26, 1889.

ATTEST
Helen Graham
W. W. Graham

INVENTOR
Frank P. Murphey
By L. P. Graham
his attorney (No Model.)  F. P. MURPHEY.  5 Sheets—Sheet 2.

CORN PLANTER.

No. 398,789.  Patented Feb. 26, 1889.

ATTEST
Helen Graham.
W. W. Graham.

INVENTOR
Frank P. Murphey
By L. P. Graham
his attorney (No Model.)　　　　F. P. MURPHEY.　　　5 Sheets—Sheet 3.
CORN PLANTER.
No. 398,789.　　　　　　Patented Feb. 26, 1889.
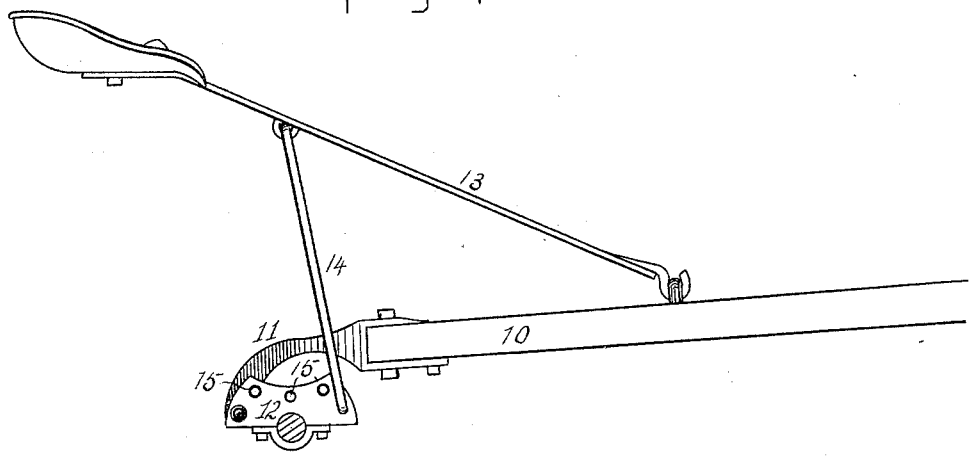
Fig. 4.
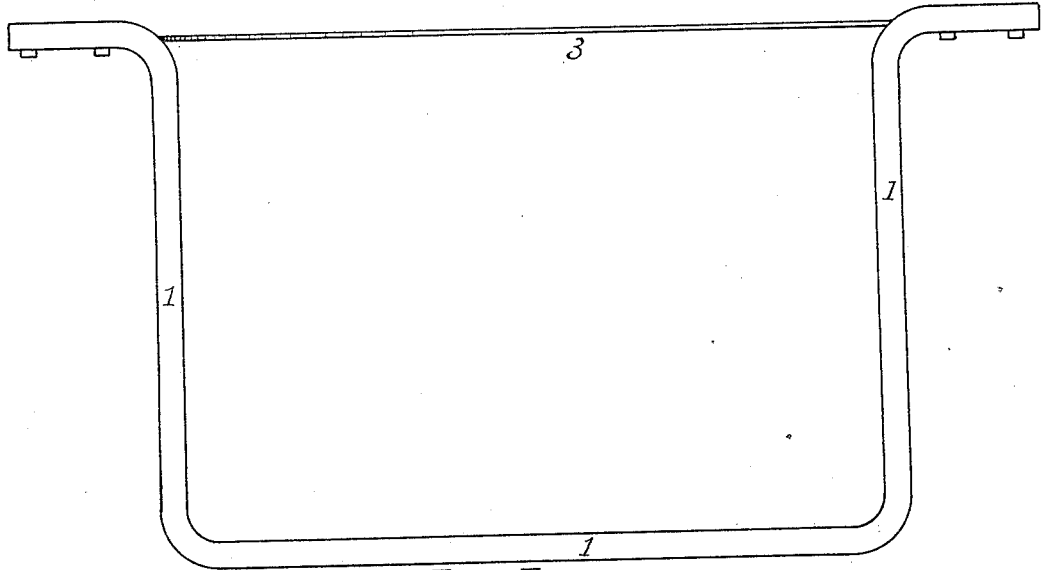
Fig. 5.
Fig. 7.
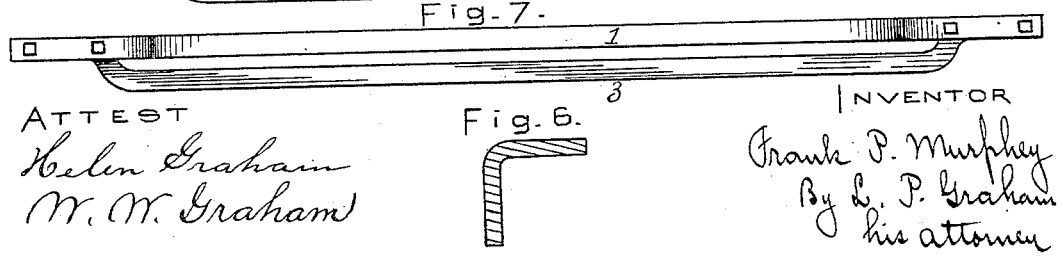
Fig. 6.
ATTEST
Helen Graham
W. W. Graham
INVENTOR
Frank P. Murphey
By L. P. Graham
his attorney (No Model.)     F. P. MURPHEY.     5 Sheets—Sheet 4.
CORN PLANTER.
No. 398,789.     Patented Feb. 26, 1889.
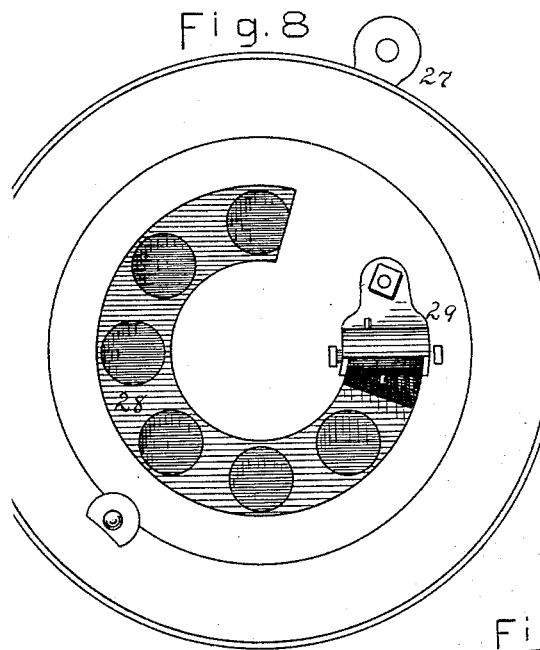
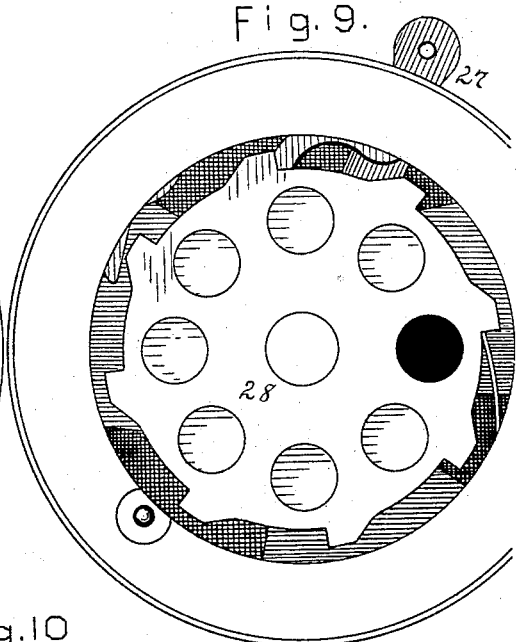
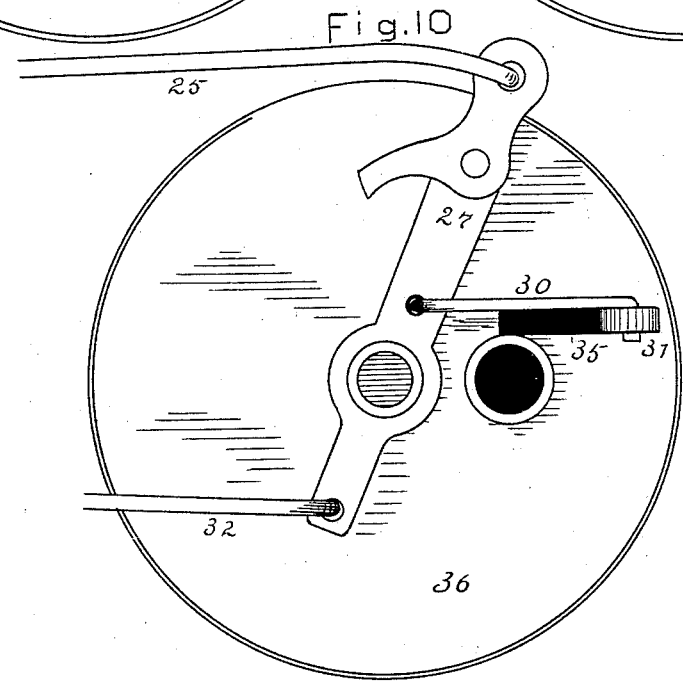
ATTEST
Helen Graham.
W. W. Graham.
INVENTOR
Frank P. Murphey
By L. P. Graham
his attorney (No Model.) F. P. MURPHEY. 5 Sheets—Sheet 5.
CORN PLANTER.
No. 398,789. Patented Feb. 26, 1889.
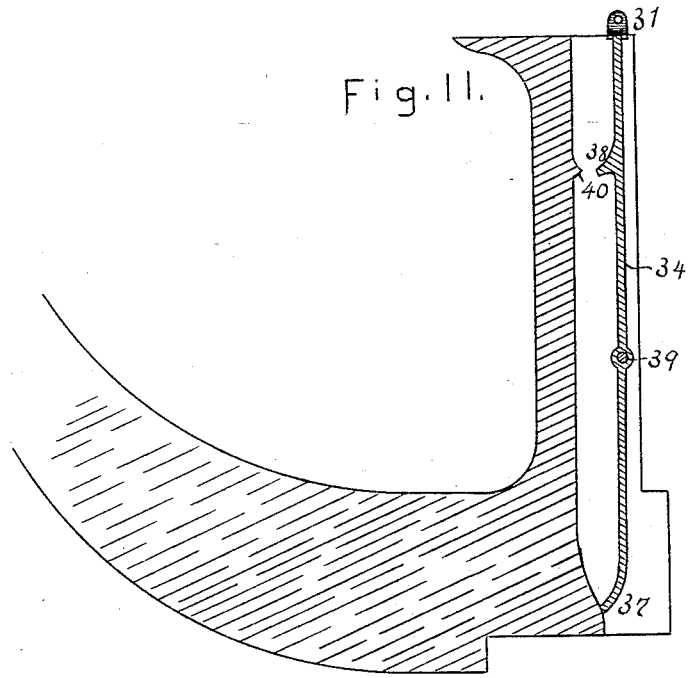
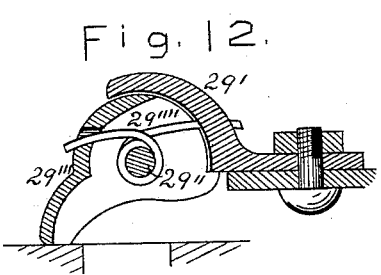
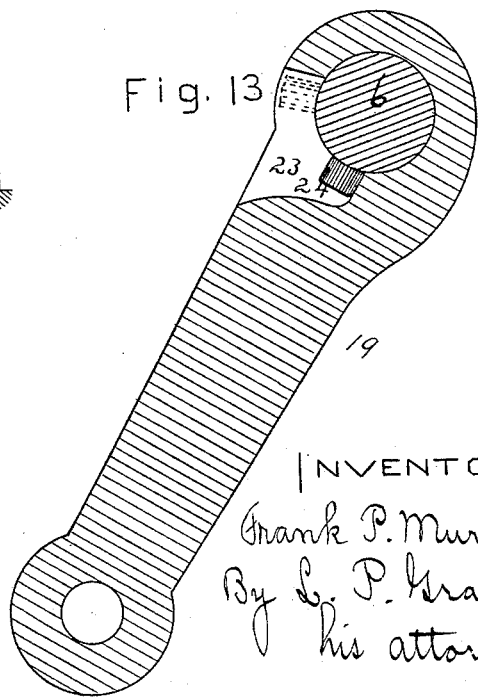
ATTEST
Helen Graham
W. W. Graham
INVENTOR
Frank P. Murphey
By L. P. Graham
his attorney

UNITED STATES PATENT OFFICE.

FRANK P. MURPHEY, OF DECATUR, ILLINOIS, ASSIGNOR OF ONE-HALF TO WILLIAM D. CHAMBERLAIN, OF SAME PLACE.

CORN-PLANTER.

SPECIFICATION forming part of Letters Patent No. 398,789, dated February 26, 1889.

Application filed May 16, 1888. Serial No. 274,104. (No model.)

*To all whom it may concern:*

Be it known that I, FRANK P. MURPHEY, of the city of Decatur, county of Macon, and State of Illinois, have invented certain new and useful Improvements in Corn-Planters, of which the following is a specification.

This invention is in the nature of an improvement on the device set forth in my patent for corn-planter, No. 381,883, issued April 24, 1888, and it comprises the various details of construction, combinations, and sub-combinations and relative arrangements of parts hereinafter set forth and claimed.

Figure 1:
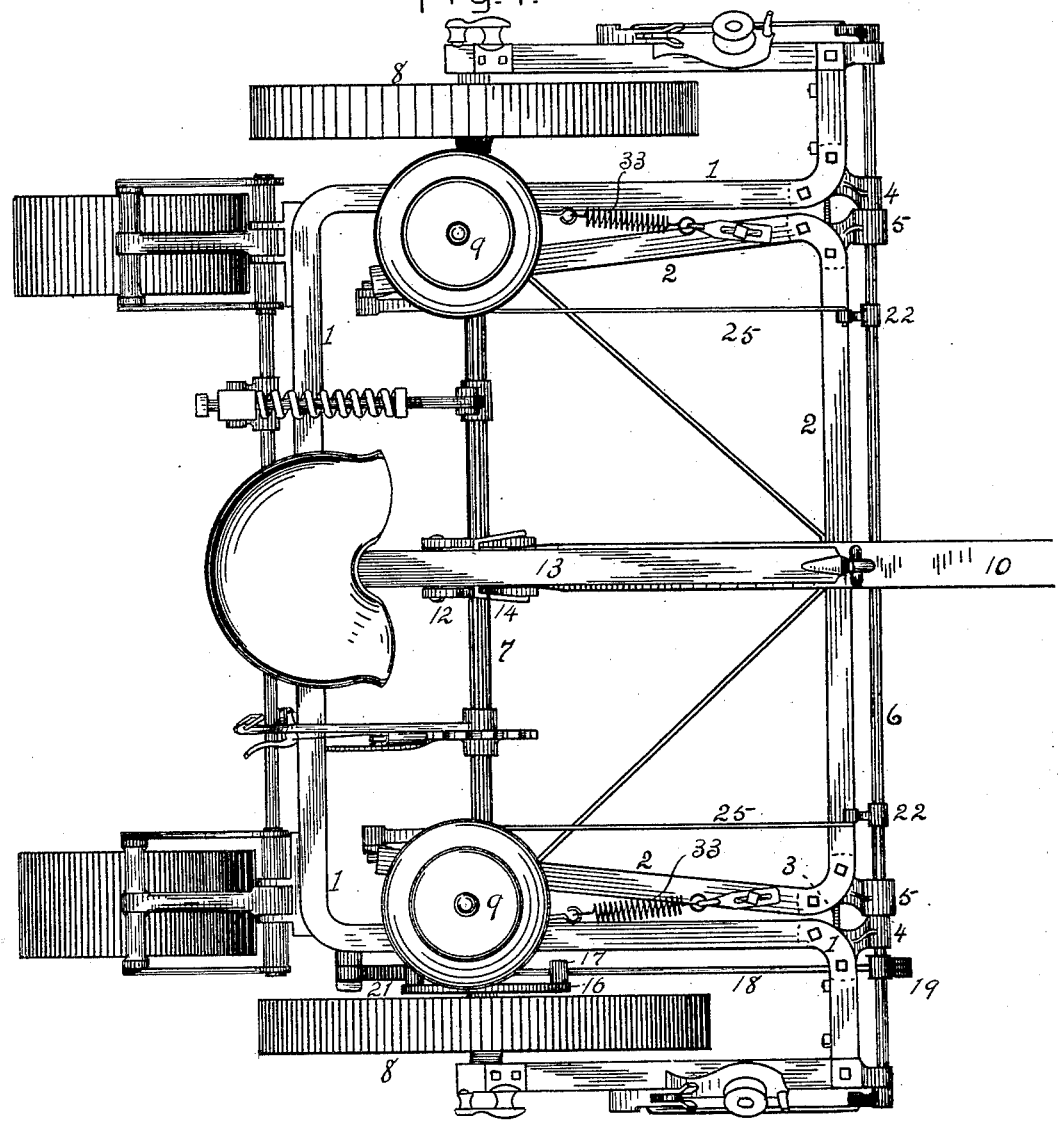
Figure 2:
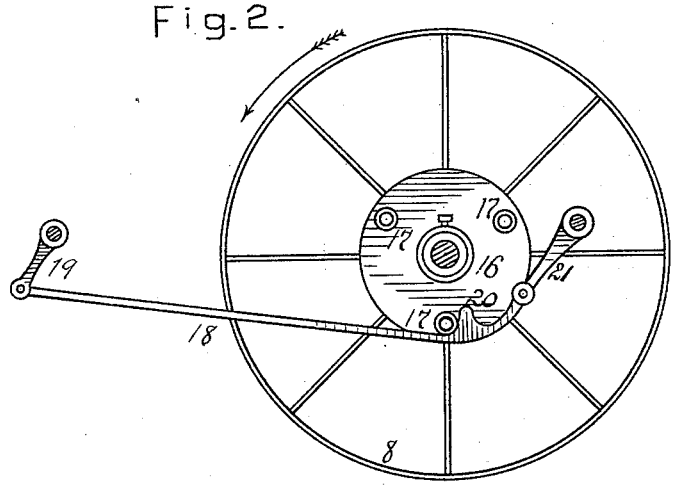
Figure 3:
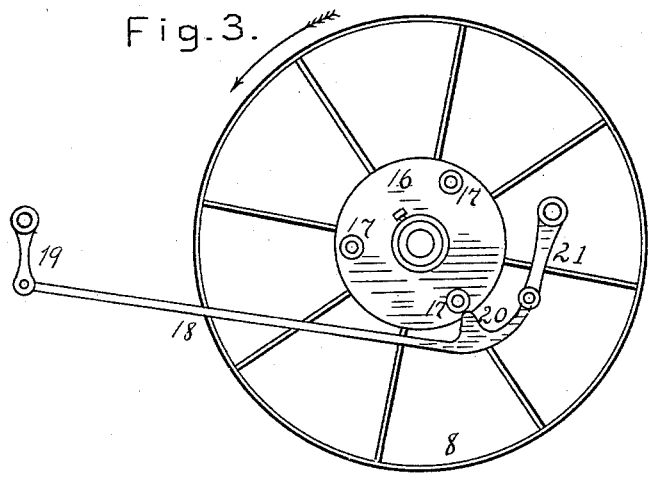

In the drawings accompanying and forming a part of this specification, Figure 1 is a plan of a corn-planter embodying my invention. Fig. 2 is a side view of the drilling device with the actuating-arm at rest. Fig. 3 is a side view of the drilling device with the actuating-arm in operation. Fig. 4 is a side view of the tongue, seat, and device for connecting said tongue and seat with the axle. Fig. 5 is a plan of the outer frame of the planter. Fig. 6 shows in cross-section the angle-iron with which both the inner and outer frame are constructed. Fig. 7 is a rear view of the outer frame. Fig. 8 is a plan of the interior of the seed-hopper. Fig. 9 is the same with the cut-off plate removed. Fig. 10 represents the bottom plate of the hopper with the seed-disk-actuating lever in position thereon, and the upper end of the second drop protruding through a slot in the plate and connecting with the lever. Fig. 11 is a vertical section of a shank, showing the second drop in position therein. Fig. 12 is a central vertical section of a cut-off; and Fig. 13 shows a section of a lever and check-row shaft, illustrating the manner in which either side of the check-row mechanism or the drilling device may be operated independently and without affecting either of the others.

The frame comprises two parts—the outer part, 1, and the inner part, 2—both of which are made of steel. The front ends of the outer part of the frame are connected by bar 3. Brackets 4 on the outer part fit in brackets 5 of the inner part and form a hinge-connection at the forward end of both frames. The hinge-connections are tubular to admit the check-row shaft 6. The outer part of the frame is supported on shaft or axle 7, which is in turn supported by wheels 8.

The hoppers 9 and the runners are carried on the inner part of the frame. The covering-wheels are carried on the rear of the outer part of the frame, and they, as well as the planting mechanism, the tongue, and the seat, are connected with and adjusted by arms on the axle 7. As shown in Fig. 4, the tongue 10 has a goose-neck, 11, that extends over the axle and connects with frame 12 in the rear thereof.

The seat-bar 13 connects pivotally with the tongue at its front end, and is supported at its rear end by brace 14, that connects adjustably with frame 12 through holes 15. With the brace in the position set forth in Fig. 4 the weight of the driver may be used to counterbalance the weight of the planting mechanism. By connecting the brace with the central hole of the frame the driver's weight will be neutralized, and by connecting with a hole to the rear of the shaft his weight may be made to assist in forcing the runners into the ground.

The drilling device comprises the disk 16, attached to a drive-wheel, and provided with face projections 17, the bar 18, connected with an arm, 19, on the check-row shaft 6, and provided with a trip projection, 20, adapted to the face projections of the disk, and the arm 21, pivoted to the frame and to the bar 18.

The operation of the drilling device is clearly indicated in Figs. 2 and 3, the former showing the beginning and the latter the ending of a stroke. The projections 17 carry the bar backward, and the arm 21 carries it downward. The downward swing of the arm will depend on the position it maintains while at rest, the more nearly horizontal its normal position the more rapid its downward swing while in operation, and this peculiarity enables the duration of the stroke to be extended or shortened at will.

The arms of the check-row mechanism 22 22 and the arm 19 of the drilling device connect with the check-row shaft after the manner set forth in Fig. 13, where 23 represents a slot in the arm, and 24 a pin in the shaft. The slot extends in the direction of the motion of the shaft, so that the shaft may move without affecting the arm, but the arm may not move without carrying the shaft.

Rods 25 connect with arms 22 on the check-row shaft and convey motion to the levers of the seed-hoppers. In Figs. 8, 9, and 10 a seed-hopper lever is indicated by 27, a seed-disk by 28, a cut-off by 29, a connecting-rod by 30, and the upper termination of a second drop by 31, the two latter appearing in Fig. 10 only, and the cut-off appearing only in Fig. 8. The lever has a drive-pawl that operates the ratchet-formed seed-disk, and a rod, 32, connecting with a spring, 33, (shown in Fig. 1,) returns the lever to its normal position after each throw of the check-row or drilling mechanism. The second drop-bar, 34, has the upper projection, 31, that protrudes through the slot 35 of the bottom of the hopper 36 and connects with the lever of the hopper. It also has the curved lower termination, 37, that co-operates with the lower portion of the shank to temporarily retain the corn, and the face projection 38 above its pivot 39. Co-operating with projection 38 is ledge 40 in the shank, and their function is to close the duct while the second drop is open, and so prevent premature discharge of corn.

The cut-off comprises the permanent piece 29', a pivot, 29'', a swinging piece, 29''', that acts as the cut-off proper, and a spring, 29'''', encircling the pivot and extending one end through the permanent part and the other end through the swinging part.

The mechanism whereby the planting and covering devices are adjusted from the axle form no part of my present invention and are fully set forth in the patent hereinbefore mentioned. On this account I have not specifically described such mechanism herein.

I claim—

1. In corn-planters, in combination, a frame comprising an inner part and an outer part, composed each of a continuous bar, and brackets at the front angles of each part forming hinge-connections, as set forth.

2. In corn-planters, in combination, the frame comprising outer part, 1, and inner part, 2, the brace-bar 3 for the outer part, and brackets 4 5, adapted to form hinge-connections at the front of both parts, as set forth.

3. In corn-planters, in combination, the drill-disk attached to a wheel and provided with projections, the bar with the trip projection adapted to the projections of the disk, the arm pivoted to the bar and to the planter-frame, and means for imparting the motion of the bar to the seed-depositing mechanism of the planter, as set forth.

4. In corn-planters, in combination, the disk 16, having projections, the check-row shaft 6, the arm 19 on the check-row shaft, constructed as specified, the bar 18, having trip projection 20, and the arm 21, pivoted to the planter-frame and to the bar 18, as set forth.

5. In corn-planters, in combination, the seed-disk having ratchet-teeth, the lever having a pawl adapted to the teeth, and the oscillating second drop connected with the lever, as set forth.

6. In corn-planters, in combination, the oscillating second drop having the upper projection, 31, the curved lower termination, 37, and the face projection 38, ledge 40 in the shank, lever 27, adapted to operate the seed-disk, and the rod to connect the second drop with the lever, as set forth.

FRANK P. MURPHEY.

Attest:
P. D. WALKER,
L. P. GRAHAM.